US007780846B2

(12) United States Patent
Weston et al.

(10) Patent No.: US 7,780,846 B2
(45) Date of Patent: Aug. 24, 2010

(54) SULFUR ADSORBENT, DESULFURIZATION SYSTEM AND METHOD FOR DESULFURIZING (75) Inventors: Eric J. Weston, Shepherdsville, KY (US); Jon P. Wagner, Louisville, KY (US); R. Steve Spivey, Louisville, KY (US); Mike McKinney, Louisville, KY (US); Michael W. Balakos, Buckner, KY (US); Russell Scott Osborne, Louisville, KY (US); Michelle Madden, Louisville, KY (US)

(73) Assignee: Sud-Chemie Inc., Louisville, KY (US)

( * ) Notice: Subject to any disclaimer, the term of this patent is extended or adjusted under 35 U.S.C. 154(b) by 916 days.

(21) Appl. No.: 11/642,438

(22) Filed: Dec. 20, 2006

(65) Prior Publication Data
US 2007/0131589 A1 Jun. 14, 2007

Related U.S. Application Data (63) Continuation-in-part of application No. 11/484,224, filed on Jul. 11, 2006, now abandoned, which is a continuation-in-part of application No. 11/207,154, filed on Aug. 18, 2005, which is a continuation-in-part of application No. 10/932,177, filed on Sep. 1, 2004, now abandoned.

(51) Int. Cl.
*C10G 25/00* (2006.01)
*C10G 25/05* (2006.01)
(52) U.S. Cl. ...................................... 208/213; 585/820
(58) Field of Classification Search ................ 208/213; 585/820
See application file for complete search history.

(56) References Cited

U.S. PATENT DOCUMENTS

| 2,882,243 A | 4/1959 | Milton |
| 2,882,244 A | 4/1959 | Milton |
| 2,927,063 A | 3/1960 | Batchelor |
| 2,950,229 A | 8/1960 | Batchelor |
| 2,950,231 A | 8/1960 | Batchelor |
| 3,024,868 A | 3/1962 | Milton |
| 3,058,800 A | 10/1962 | Frevel |
| 3,063,936 A | 11/1962 | Pearce |
| 3,101,303 A | 8/1963 | Batchelor |
| 3,492,083 A | 1/1970 | Lowicki |
| 3,723,598 A | 3/1973 | Spedden |
| 3,760,029 A | 9/1973 | McCoy |
| 3,761,570 A | 9/1973 | Lowicki |
| 3,816,975 A | 6/1974 | Collins |
| 3,890,120 A | 6/1975 | Guyot |
| 3,893,949 A | 7/1975 | Sakai |
| 4,059,418 A | 11/1977 | Cull |
| 4,098,694 A | 7/1978 | Perlaky |
| 4,113,604 A | 9/1978 | Carlson |
| 4,177,203 A | 12/1979 | Kolbel |
| 4,180,549 A | 12/1979 | Olsson |
| 4,225,417 A | 9/1980 | Nelson |
| 4,233,276 A | 11/1980 | D'Souza |
| 4,283,374 A | 8/1981 | Erickson |
| 4,329,160 A | 5/1982 | Sherman |
| 4,358,297 A | 11/1982 | Eberly, Jr. |
| 4,440,551 A | 4/1984 | Henning |
| 4,486,298 A | 12/1984 | Bowes |
| 4,489,047 A | 12/1984 | de Jong |
| 4,540,842 A | 9/1985 | Allen |
| 4,557,823 A | 12/1985 | Kukes |
| 4,613,724 A | 9/1986 | Debras |
| 4,729,889 A | 3/1988 | Stephanopoulos |
| 4,795,545 A | 1/1989 | Schmidt |
| 4,835,338 A | 5/1989 | Liu |
| 4,992,620 A | 2/1991 | Nowack |
| 5,026,536 A | 6/1991 | Shioiri |
| 5,057,473 A | 10/1991 | Voecks |
| 5,080,867 A | 1/1992 | Cooke |
| 5,085,844 A | 2/1992 | Nowack |
| 5,106,484 A | 4/1992 | Nadler |
| 5,114,689 A | 5/1992 | Nagji |
| 5,130,115 A | 7/1992 | Fujisou |
| 5,149,600 A | 9/1992 | Yamase |
| 5,157,201 A | 10/1992 | Norris |
| 5,268,091 A | 12/1993 | Boitiaux |
| 5,281,445 A | 1/1994 | Khare |
| 5,302,470 A | 4/1994 | Okada |
| 5,322,615 A | 6/1994 | Holtermann |
| 5,348,928 A | 9/1994 | Kukes |

(Continued)

FOREIGN PATENT DOCUMENTS

CA          1230466       12/1987

(Continued)

OTHER PUBLICATIONS

U.S. Appl. No. 10/932,177, filed Sep. 1, 2004, Weston.

*Primary Examiner*—Tam M Nguyen
(74) *Attorney, Agent, or Firm*—Scott R. Cox; Lynn Schwenning (57) ABSTRACT

A method for producing a substantially desulfurized hydrocarbon fuel stream at temperatures less than 100° C. including providing a nondesulfurized fuel cell hydrocarbon fuel stream and passing the fuel stream through a sulfur adsorbent system containing a specialized sulfur adsorbent containing hydrated alumina to produce a substantially desulfurized hydrocarbon fuel stream.

19 Claims, 1 Drawing Sheet

U.S. PATENT DOCUMENTS

| | | |
|---|---|---|
| 5,421,994 A | 6/1995 | Sarrazin |
| 5,605,619 A | 2/1997 | Holt |
| 5,648,312 A | 7/1997 | Rivas |
| 5,686,196 A | 11/1997 | Singh |
| 5,700,439 A | 12/1997 | Goyette |
| 5,769,909 A | 6/1998 | Bonk |
| 5,800,798 A | 9/1998 | Ino |
| 5,853,570 A | 12/1998 | Hatanaka |
| 5,914,293 A | 6/1999 | Bhattacharyya |
| 5,928,980 A | 7/1999 | Gangwal |
| 5,955,393 A | 9/1999 | Moskovitz |
| 5,990,372 A | 11/1999 | Blankenship |
| 6,083,379 A | 7/2000 | Drake |
| 6,156,084 A | 12/2000 | Bonville |
| 6,159,256 A | 12/2000 | Bonville |
| 6,162,267 A | 12/2000 | Priegnitz |
| 6,183,895 B1 | 2/2001 | Kudo |
| 6,190,623 B1 | 2/2001 | Sanger |
| 6,210,821 B1 | 4/2001 | Lesieur |
| 6,342,191 B1 * | 1/2002 | Kepner et al. ............... 423/210 |
| 6,383,981 B1 | 5/2002 | Blankenship |
| 6,531,053 B2 | 3/2003 | Khare |
| 6,683,024 B1 | 1/2004 | Khare |
| 6,693,057 B1 | 2/2004 | Cai |
| 2002/0159939 A1 | 10/2002 | Lieftink |
| 2003/0166464 A1 | 9/2003 | Price |
| 2004/0063576 A1 | 4/2004 | Weston |
| 2006/0043001 A1 | 3/2006 | Weston |
| 2006/0283780 A1 | 12/2006 | Spivey |

FOREIGN PATENT DOCUMENTS

| | | |
|---|---|---|
| DE | 3816599 | 3/1989 |
| DE | 3719138 | 12/1998 |
| EP | 0045865 | 2/1982 |
| GB | 1144071 | 3/1969 |
| GB | 1415108 | 11/1975 |
| GB | 1529537 | 10/1978 |
| GB | 2157308 | 10/1985 |
| GB | 2162194 | 1/1986 |
| GB | 2242199 | 9/1991 |
| WO | WO 03/076066 | 9/2003 |
| WO | WO2006028686 A1 | 3/2006 |
| WO | WO2007021554 A2 | 2/2007 |
| WO | WO2007021633 A2 | 2/2007 |

* cited by examiner

FIGURE 1

SULFUR ADSORBENT, DESULFURIZATION SYSTEM AND METHOD FOR DESULFURIZING

CROSS REFERENCED TO RELATED APPLICATIONS

This application is a continuation-in-part application based on application Ser. No. 11/484,224, filed on Jul. 11, 2006 now abandoned, which is a continuation-in-part application based on application Ser. No. 11/207,154, filed on Aug. 18, 2005, which is a continuation-in-part application based on application Ser. No. 10/932,177, which was filed on Sep. 1, 2004 now abandoned.

BACKGROUND OF INVENTION

A preferred embodiment of the invention relates to a novel method for producing a substantially desulfurized hydrocarbon fuel stream, particularly for hydrogen generation, and more particularly for use within a fuel cell processing train, by passing a nondesulfurized hydrocarbon fuel stream, particularly natural gas, propane or liquefied petroleum gas (LPG), through a desulfurization system at temperatures less than 100° C., wherein the desulfurization system includes a specialized sulfur adsorbent containing hydrated alumina and preferably also includes a zeolite sulfur adsorbent, and/or a selective sulfur adsorbent. Another preferred embodiment of the invention relates to a process for producing hydrogen within a fuel cell processing train from a substantially desulfurized hydrocarbon fuel stream, particularly desulfurized natural gas, propane or LPG, wherein the hydrocarbon fuel stream is desulfurized using the above-described desulfurization system. Another preferred embodiment of the invention further includes the desulfurization system described above utilized for hydrogen generation, particularly within a fuel cell processing train, which system desulfurizes hydrocarbon fuel streams, particularly comprising natural gas, propane or LPG, at temperatures as low as ambient temperature, even when the level of water or other hydrolyzing agents within that fuel stream is less than 500 ppm.

For hydrogen generation, particularly for use in a conventional low temperature fuel cell processing train, such as a proton exchange membrane (PEM) fuel cell, which is suitable for use in a stationary application or in a vehicle, such as an automobile, the hydrocarbon fuel stream can be derived from a number of conventional fuel sources with the preferred fuel sources including natural gas, propane and LPG. In a conventional hydrogen generation system, particularly a typical fuel cell processing train, the hydrocarbon fuel stream is passed over and/or through a desulfurization system to be desulfurized. The desulfurized hydrocarbon fuel stream then flows into a reformer wherein the fuel stream is converted into a hydrogen-rich fuel stream. From the reformer the fuel stream passes through one or more heat exchangers to a shift converter where the amount of CO in the fuel stream is reduced. From the shift converter the fuel stream again passes through various heat exchangers and then through a selective oxidizer or selective methanizer having one or more catalyst beds, after which the hydrogen rich fuel stream flows to the fuel cell stack where it is utilized to generate electricity.

Raw fuels, in gaseous or liquid phase, particularly natural gas, propane and LPG, are useful as a fuel source for hydrogen generation, particularly for fuel cell processing trains. Unfortunately, virtually all raw fuels of this type contain relatively high levels, up to as high as 1,000 ppm or so, but typically in the range of 20 to 500 ppm, of various naturally occurring sulfur compounds, such as, but not limited to, carbonyl sulfide, hydrogen sulfide, thiophenes, such as tetra hydro thiophene, dimethyl sulfide, various mercaptans, disulfides, sulfoxides, other organic sulfides, higher molecular weight organic sulfur compounds, and combinations thereof.

In addition, because hydrocarbon fuel streams, particularly natural gas, propane and LPG, may have different sources of origin, the quantity and composition of the sulfur compounds that may be present in the fuel streams can vary substantially. Further, these fuel stream sources generally contain only low quantities of water and other hydrolyzing agents, generally at a level that may be as low as 500 ppm or lower.

The presence of sulfur-containing compounds, particularly carbonyl sulfide, in a hydrocarbon fuel stream can be very damaging to components of the fuel cell processing train, including the fuel cell stack itself, and such compounds must therefore be substantially removed. If not substantially removed, the sulfur compounds may shorten the life expectancy of the components of the fuel cell processing train.

An especially efficient desulfurization system is necessary for use in such fuel cell processing trains as they generally only contain a single desulfurization system. Further, desulfurization systems for such uses must have high capacity, as they may need to be in use for an extended period of time before replacement.

Several processes, conventionally termed "desulfurization," have been employed for the removal of sulfur from gas and liquid fuel streams for hydrogen generation. Adsorption of sulfur-contaminated compounds from these hydrocarbon streams using a "physical" sulfur adsorbent is the most common method for removal of sulfur compounds from such hydrocarbon fuel streams because of their relatively low capital and operational costs. (For purposes of this specification, the terms "adsorption" and "absorption" as well as "adsorbents" and "absorbents" each have the same, all inclusive meaning.) While physical adsorbents are useful, they can desorb the sulfur compounds from the adsorbent under certain operating conditions. In addition, there are often limits on the quantity of sulfur compounds which can be adsorbed by such physical sulfur adsorbents.

An additional type of adsorbent that has been useful as a desulfurization agent is a "chemical" sulfur adsorbent. However, chemical desulfurization normally requires the desulfurization system to be heated to temperatures of 150° C. to 400° C. before the nondesulfurized hydrocarbon fuel streams can be effectively desulfurized by the chemical adsorbent desulfurization system. In addition, other operational problems may occur when such chemical desulfurization processes are utilized.

While many different desulfurization processes have been suggested for hydrocarbon fuel streams, there is still a need for improved processes for desulfurization to achieve enhanced adsorption of sulfur components, especially carbonyl sulfide, over an extended range of sulfur concentrations, especially at relatively low operating temperatures and pressures, and for extended periods of time. In addition, these improved processes for desulfurization must be able to achieve enhanced adsorption of sulfur compounds even when the quantity of water or other hydrolyzing agents in the feed stream is low, i.e. less than 500 ppm. Further, there is a need for improved desulfurization system to adsorb substantial quantities of a wide range of sulfur compounds, including particularly hydrogen sulfide, carbonyl sulfide, tetra hydro thiophene, dimethyl sulfide, various mercaptans, disulfides, sulfoxides, other organic sulfides, various higher molecular weight sulfur-containing compounds and combinations thereof, especially carbonyl sulfide without the addition of hydrolyzing agents. Further, it is important that these improved desulfurization systems absorb this broad range of sulfur compounds effectively for an extended period of time to delay "breakthrough" of sulfur compounds as long as possible. "Breakthrough" occurs when the amount of any sulfur compound remaining in the feed stream after desulfurization is above a predetermined level. Typical "breakthrough" levels for sulfur compounds occur at less than 1 ppm. Breakthrough by virtually any of the sulfur compounds present in the hydrocarbon fuel stream is disadvantageous as substantially all sulfur compounds can cause damage to components of a hydrogen generation system, particularly for a fuel cell processing train. Further, some sulfur compounds, particularly carbonyl sulfide, are quite difficult to remove from such fuel streams, especially without the addition of hydrolyzing agents.

In addition, some prior art adsorbents, while effective as adsorbents for some sulfur compounds, can synthesize the production of sulfur compounds even as they are removing some of the naturally occurring sulfur compounds that are present in the hydrocarbon fuel stream. (These newly produced sulfur compounds are referred to herein as "synthesized sulfur compounds.") It is important that the desulfurization system that is chosen avoid the production of synthesized sulfur compounds to the greatest extent possible and for the longest period of time possible.

The foregoing description of preferred embodiments of the invention provides processes, systems and products that address some or all of the issues discussed above.

SUMMARY OF INVENTION

One of the preferred embodiments disclosed is a process for supplying a substantially desulfurized hydrocarbon fuel stream, particularly for hydrogen generation, and most particularly for use in a fuel cell processing train, comprising providing a nondesulfurized hydrocarbon fuel stream, preparing a desulfurization system comprising at least a specialized sulfur adsorbent containing hydrated alumina, and preferably comprising a multi-component desulfurization system comprising the specialized sulfur adsorbent containing hydrated alumina with a calcium exchanged zeolite sulfur adsorbent, and/or a selective sulfur adsorbent, and passing the nondesulfurized hydrocarbon fuel stream through or over the desulfurization system at a temperature optimally less than about 100° C. to produce a substantially desulfurized hydrocarbon fuel stream with desulfurization levels as low as about 50 ppb or so. Preferably, this level of desulfurization is accomplished even when the level of water and other hydrolyzing agents that are present in the feed stream are less than 500 ppm. One feature of one preferred embodiment of this invention is that effective sulfur removal, particularly for the removal of carbonyl sulfide, can be achieved without the addition of conventional hydrolyzing agents to the feed stream. The composition of the multi-component desulfurization system and the choice of the specific selective sulfur adsorbent(s) utilized within the mutli-component desulfurization system depends on the composition of the sulfur compounds which are present in that fuel stream and the extent of sulfur removal and time before breakthrough occurs that are required.

Another of the preferred embodiments disclosed is a process for generating hydrogen for use in a fuel cell processing train by use of a substantially desulfurized hydrocarbon fuel stream comprising preparing a fuel cell processing train containing the desulfurization system(s) described above, passing a nondesulfurized hydrocarbon fuel cell fuel stream through the desulfurization system(s) at a temperature, preferably less than about 100° C., and introducing the substantially desulfurized hydrocarbon fuel stream to the remaining components of the fuel cell processing train.

Another of the preferred embodiments is a desulfurization system, particularly for hydrogen generation and most particularly for use in a fuel cell processing train, comprising an inlet for receiving a nondesulfurized hydrocarbon fuel stream, particularly natural gas, propane and/or LPG, the desulfurization system(s) described above, and an outlet for passing a substantially desulfurized hydrocarbon fuel stream downstream to the remaining components of the hydrogen generation system.

A further preferred embodiment is a desulfurization system, particularly for hydrogen generation and most particularly for use in a fuel cell processing train, comprising, a specialized sulfur adsorbent containing hydrated alumina preferably utilized in a multi-component desulfurization system comprising the specialized sulfur adsorbent containing hydrated alumina adsorbent and a calcium exchanged zeolite and/or a selective sulfur adsorbent. The choice of the specific selective sulfur adsorbent that is used, if one is utilized within the multi-component desulfurization system, depends upon the composition and quantity of the sulfur compounds that are present in the hydrocarbon fuel stream and the level of sulfur removal and time for breakthrough that are required. One particularly preferred selective sulfur adsorbent comprises one or more manganese compounds, copper oxide and a binder. An alternative preferred selective sulfur adsorbent comprises one or more manganese compounds, iron oxide and a high surface area carrier, particularly alumina. A further alternative preferred selective sulfur adsorbent comprises copper oxide, zinc oxide, a carrier, preferably amorphous aluminum, and preferably small quantities of a carbon compound. Further, more than one of these selective sulfur adsorbents can be utilized in the desulfurization system, if desired.

DISCLOSURE OF A PREFERRED EMBODIMENT OF THE INVENTION

One embodiment of the invention includes, but is not limited to, a method for supplying a substantially desulfurized hydrocarbon fuel stream, particularly for a hydrogen generation system and most particularly for a fuel cell processing train. Raw fuel, for use in such hydrogen generation system, particularly a fuel cell processing train, such as natural gas, propane and LPG, must be desulfurized prior to use because such fuel streams contain relatively high levels of sulfur compounds, such as, but not limited to, hydrogen sulfide, carbonyl sulfide, thiophenes, such as tetra hydro thiophene, dimethyl sulfide, mercaptans (including ethyl, methyl, propyl and tertiary butyl mercaptan), other sulfides, various higher molecular weight organic sulfur compounds and combinations thereof. In addition, some sulfur compounds, particularly carbonyl sulfide, can be quite difficult to remove from such raw fuel. These sulfur compounds can damage components of the hydrogen generation system and the fuel cell processing train. While numerous combinations and quantities of these sulfur compounds may be present in the fuel stream, in some situations the sulfur compounds present in the fuel stream may be limited to only one or two of such sulfur compounds. Such raw fuels, particularly natural gas, generally contain limited amounts of water and other common hydrolyzing agents, such as ethanol or methane, generally 500 ppm or less.

It is one feature of this invention that effective removal of sulfur compounds, particularly carbonyl sulfide, can be achieved without the addition of a hydrolyzing agent, such as water, ethanol or methanol to the fuel stream.

Where the raw fuel stream comprises natural gas, which is in a gaseous state at operating temperatures below 100° C., particularly below 60° C., and most preferably about room temperature, the level of sulfur compounds, such as carbonyl sulfide, hydrogen sulfide, tetra hydro thiophene, dimethyl sulfide, mercaptans, other organic sulfur compounds, and combinations thereof may be 1 ppm or higher. The presence of high levels of sulfur compounds, if not removed, results in the poisoning of components of the fuel cell processing train and may foul the fuel cell stack itself. Substantially complete removal of all of the sulfur compounds is necessary as the presence of even modest quantities of even a single sulfur compound can damage components of the fuel cell processing train.

While the desulfurization system(s) of one embodiment of the invention can be utilized for a number of different hydrogen generation processes, one particularly preferred utilization is within a fuel cell processing train. For purposes of this specification while the use of this desulfurization system with all hydrogen generation systems is included, one preferred embodiment is the use of this system within a fuel cell processing train.

In one preferred embodiment of the invention, the inventors have surprisingly discovered that substantial desulfurization of a hydrocarbon fuel stream down to levels as low as 50 ppb or so can be achieved when a desulfurization system is used which comprises, a specialized sulfur adsorbent containing hydrated alumina, preferably a multi-component desulfurization system comprising the specialized sulfur adsorbent containing hydrated alumina and a zeolite sulfur adsorbent, and/or a selective sulfur adsorbent, and more preferably, a calcium exchanged zeolite, more particularly a calcium exchanged zeolite X or LSX, the specialized sulfur adsorbent containing hydrated alumina, and a selective sulfur adsorbent. In an additional preferred embodiment, the sequence of use of the components in the system is first the zeolite adsorbent, then the specialized sulfur adsorbent containing hydrated alumina, and finally the selective sulfur adsorbent. The composition, number and order of the components of the mutli-component desulfurization system can be modified depending on the composition and quantity of the sulfur compounds and the composition of other materials that are present in the hydrocarbon feed stream, the extent of removal of sulfur that is required and the time that is required before breakthrough can occur.

It is possible to achieve effective sulfur removal from a feed stream where two or more of the components of the mutli-component desulfurization system are partially or completely blended together before placement in the desulfurization system. For example, some portion or all of the specialized sulfur adsorbent containing hydrated alumina may be blended with either or both of the calcium exchanged zeolite and the selective sulfur adsorbent. It is preferred, however, to separate the three components from each other even though minimal blending of the components may occur at the border between two components when those components are placed together, for example, when the components are introduced in layers without any physical separation therebetween.

The selective sulfur adsorbent(s) of the invention may be selected from a wide variety of adsorbents. As used herein a "selective sulfur adsorbent" is a material that preferentially absorbs at least one of the sulfur compounds that are commonly present in hydrocarbon fuel cell fuel streams, particularly natural gas, propane or LPG, such as hydrogen sulfide, carbonyl sulfide, tetra hydro thiophene, dimethyl sulfide, mercaptans, particularly ethyl, methyl, propyl, and tertiary butyl mercaptans and combinations thereof, particularly carbonyl sulfide, at a temperature below about 100° C., particularly below 60° C., and at pressures of about 1 bar to 25 bar. These fuel streams also commonly contain less than 500 ppm of water and other hydrolyzing agents, such as ethanol and methanol. Because of the choice of the components of the sequential bed, it is not necessary to add a hydrolyzing agent to the feed stream, to hydrolyze one or more of the sulfur compounds contained therein, particularly COS, before they are removed therefrom.

Each selective sulfur adsorbent selectively adsorbs one or more of the sulfur compounds that are commonly present in the hydrocarbon fuel cell fuel stream, preferably natural gas. However, each of these adsorbents may be less or more effective than other of the selective sulfur adsorbents for the adsorption of other sulfur compounds or combinations of these compounds. Further, problems can be created in the feed stream when some of the selective sulfur adsorbents are used, as these selective sulfur adsorbents can synthesize existing sulfur compounds into different, higher molecular weight sulfur compounds that are not removable from the fuel stream by the particular selective sulfur adsorbent that is utilized.

It has been surprisingly discovered that the performance of a desulfurization system can be substantially enhanced by utilizing a multi-component desulfurization system comprising a zeolite adsorbent, particularly a calcium exchanged zeolite, and more particularly a calcium exchanged zeolite X or LSX, and a specialized sulfur adsorbent containing hydrated alumina in sequence before the selective sulfur adsorbent. In particular, the combination of a selective sulfur adsorbent with the calcium exchanged zeolite adsorbent and the specialized sulfur adsorbent containing hydrated alumina performs surprisingly better than any of the individual selective sulfur adsorbents, the specialized sulfur adsorbent containing hydrated alumina, or the calcium exchanged zeolite, when used individually, or even the selective sulfur adsorbent utilized with the calcium exchanged zeolite, without also using the specialized sulfur adsorbent containing hydrated alumina. The preferred choice and arrangement of the selective sulfur adsorbent(s), the specialized sulfur adsorbent containing hydrated alumina, and the zeolite within the multi-component desulfurization system also reduces the likelihood of the production of synthesized sulfur compounds that are sometimes created when a selective sulfur adsorbent is used with or without the calcium exchanged zeolite in a desulfurization system.

It has been further surprisingly discovered that the removal of various combinations of sulfur compounds can be enhanced by the specific arrangement and choice of the adsorbents in the multi-component desulfurization system. For the removal of various sulfur compounds, it is preferable to place the calcium exchanged zeolite in the multi-component desulfurization system prior to both the specialized sulfur adsorbent containing hydrated alumina and the selective sulfur adsorbent. In a more preferred embodiment the sequence of the components of the multi-component desulfurization system is first the calcium exchanged zeolite, followed by the specialized sulfur adsorbent containing hydrated alumina and finally the selective sulfur adsorbent.

Sulfur adsorption by this system is further enhanced because some sulfur compounds, which may be synthesized to larger and more difficult to remove sulfur compounds by a particular selective sulfur adsorbent, are removed from the feed stream by the zeolite adsorbent, particularly the calcium-exchanged zeolite adsorbent and/or the specialized sulfur adsorbent containing hydrated alumina when used in combination, prior to synthesis by the selective sulfur adsorbent.

Useful selective sulfur adsorbents are selected from a group of adsorbents including, but not limited to, an adsorbent comprising substantially manganese compounds; an adsorbent which includes manganese compounds, copper oxide and a binder; an adsorbent which includes manganese compounds, iron oxide and a support, particularly alumina, most particularly a hydrated alumina; an adsorbent which includes zinc oxide and a carrier, particularly alumina; an adsorbent which includes activated carbon with copper oxide; an adsorbent which includes a zinc oxide/copper oxide blend, preferably containing small quantities of carbon and amorphous aluminum; an adsorbent which includes copper oxide with alumina; an adsorbent which includes nickel on silica or alumina and various known selective sulfur adsorbents which include copper and zinc. Various quantities of the individual components of each of these selective sulfur adsorbents can be utilized and the quantity of the individual components can be modified to enhance the adsorption capacity of the overall desulfurization system, depending on the particular sulfur compounds that are present in the hydrocarbon fuel cell fuel stream and the quantity thereof.

In one preferred embodiment, the selective sulfur adsorbent includes one or more manganese compounds blended with iron oxide on a support, such as alumina, silica, silica-alumina, titania, and other inorganic refractory oxides. The preferred quantity of the support comprises from about 5 to about 25% by weight, preferably from about 5 to about 20% by weight, and most preferably from about 5 to about 15% by weight of the total weight of this selective sulfur adsorbent. One primary function of the support material is to provide a large and accessible surface area for deposition of the active metal compounds.

The metal compounds which are deposited on or incorporated within the support of this selective sulfur adsorbent, other than the one or more manganese compound(s), include iron oxide. In a preferred embodiment the iron oxide and manganese compound(s) together comprise at least about 60% by weight, preferably at least about 70% by weight and most preferably about 80% to about 90% of this selective sulfur adsorbent, by weight.

In a preferred embodiment the quantity of iron oxide present in this selective sulfur adsorbent exceeds the quantity of the manganese compound(s). It is preferred that the ratio of the iron oxide to the manganese compound(s) by weight, should be at least about 1:1 and preferably from about 1:1 to about 6:1. The preferred loading of iron oxide on the support is in the range of about 40 weight percent to about 80 weight percent and, more preferably from about 50 to about 70 weight percent of the total weight of the selective sulfur adsorbent. Various forms of iron oxide may be used, such as FeO and $Fe_2O_3$ and mixtures thereof.

The one or more manganese compound(s) comprise from about 15 weight percent to about 40 weight percent, preferably from about 20 weight percent to about 40 weight percent of the total weight of the selective sulfur adsorbent. Various forms of manganese compounds can be used including $MnO_2$, $Mn_2O_3$, $Mn_3O_4$ and $Mn(OH)_4$ and mixtures thereof.

A promoter or promoters may also be added to this selective sulfur adsorbent, preferably an alkali or alkaline earth metal oxide, promoter and more preferably calcium oxide, in quantities from about 5 to about 15% by weight. While calcium oxide is the preferred promoter, alkali or other alkaline earth metal oxide promoters, such as magnesium oxide, may also, or alternatively, be utilized in combination with the calcium oxide.

The iron oxide/manganese compound(s) selective sulfur adsorbent may be prepared by coprecipitation, decomposition, impregnation or mechanical mixing. Preferably, this selective sulfur adsorbent is produced by coprecipitation or decomposition. The method chosen should guarantee that there has been an intensive blending of the components of the selective sulfur adsorbent.

The pore volume of the iron oxide/manganese compound (s) adsorbent produced by those procedures determined by mercury porosimetry is preferably from about 0.3 cc/g to about 0.6 cc/g. In addition, this selective sulfur adsorbent preferably has a compacted bulk density of about 0.4 to about 1.1 g/cc. Once the material is in its preliminary product form, it can be further processed to form the final selective sulfur adsorbent by pelletizing or extrusion. This selective sulfur adsorbent preferably is formed into moldings, especially in the form of spheres or pellets, preferably ranging in size from about 0.1 cm to about 1 cm in diameter. The materials for this selective sulfur adsorbent are preferably chosen to achieve a surface area of at least about 100 $m^2/g$ and more preferably from about 100 $m^2/g$ to about 300 $m^2/g$.

This iron oxide/manganese compound(s) selective sulfur adsorbent when used alone has shown especially good sulfur adsorption when the sulfur compounds contained in a fuel cell fuel stream comprise hydrogen sulfide, carbonyl sulfide (COS), tertiary butyl mercaptan (TBM) and ethyl mercaptan (EM). This selective sulfur adsorbent, when utilized with the calcium-exchanged zeolite adsorbent and the hydrated alumina adsorbent, has shown enhanced utility for adsorption of sulfur compounds that are commonly present in a fuel cell fuel stream including COS, tetra hydro thiophene (THT) and dimethyl sulfide (DMS), especially when the zeolite is placed in a adsorption system in sequence before the hydrated alumina adsorbent followed by the iron oxide/manganese compound(s) adsorbent in the desulfurization system.

An additional preferred selective sulfur adsorbent that can be utilized with the zeolite adsorbent and the specialized sulfur adsorbent containing hydrated alumina in the multi-component desulfurization system includes one or more manganese compound(s), copper oxide and small quantities of a binder. The manganese compound(s) of this selective sulfur adsorbent may be utilized in any of the forms previously described for the manganese compound of the selective sulfur adsorbent described above. The manganese compound(s) of this selective sulfur adsorbent comprise from about 50 to about 80% and preferably from about 60 to about 75% of this selective sulfur adsorbent, by weight. The copper oxide comprises from about 15 to about 40% and preferably from about 15 to about 30%, by weight, of this selective sulfur adsorbent. The binder comprises from about 5 to 20%, by weight, of this selective sulfur adsorbent. In a preferred embodiment the binder may be selected from a wide variety of clays including bentonite, diatomaceous earth, attapulgite, kaolin, sepiolite, illite and mixtures thereof. More preferably, the binder comprises bentonite clay. Promoters may be added to this selective sulfur adsorbent to enhance its operating characteristics. This adsorbent is prepared by conventional procedures. The materials for this selective sulfur adsorbent are chosen so that the surface area of this manganese compound(s)/copper oxide with binder ranges from about 100 to about 300 $m^2/g$, preferably from about 200 to about 300 $m^2/g$.

This manganese compound(s)/copper oxide/binder selective sulfur adsorbent when used alone has shown great utility for the adsorption of hydrogen sulfide, carbonyl sulfide, tertiary butyl mercaptan, ethyl mercaptan and mixtures thereof. In addition, this manganese compound(s)/copper oxide/binder selective sulfur adsorbent, when utilized with the zeolite adsorbent and the specialized sulfur adsorbent containing hydrated alumina in the multi-component desulfurization system, has shown significant adsorption for sulfur compounds contained in hydrocarbon fuel cell feed streams of the same type as those described above where the selective sulfur adsorbent composition comprises iron oxide, manganese compound(s) and small quantities of a support. This selective sulfur adsorbent has shown particular utility when it is necessary to reduce the level of carbonyl sulfide in the feed stream to extremely low levels, as low as 50 ppb or so, especially without the addition of any hydrolyzing agent to the feed stream.

An additional preferred selective sulfur adsorbent that can be utilized with the zeolite adsorbent and the specialized sulfur adsorbent containing hydrated alumina in the multi-component sulfur adsorption system comprises copper oxide and zinc oxide with amorphous aluminum and, preferably with small quantities of carbon. In a preferred embodiment the copper oxide comprises from about 50 to about 65% and more preferably from about 50 to about 60% of the selective sulfur adsorbent, by weight. The zinc oxide comprises from about 20 to about 35% of the selective sulfur adsorbent and the amorphous aluminum comprises from about 5 to about 20%, preferably from about 10 to 20% of the selective sulfur adsorbent, by weight. The quantity of the carbon, if used, should be less than 10%, preferably from about 1 to about 10%, by weight. The surface area of this selective sulfur adsorbent containing copper oxide, zinc oxide, amorphous aluminum, and preferably small quantities of carbon, is from about 100 to about 300 $m^2/g$ and preferably from about 100 to about 200 $m^2/g$. The process for the preparation of this selective sulfur adsorbent is conventional. This copper oxide/zinc oxide/amorphous aluminum, preferably with small quantities of carbon, selective sulfur adsorbent when used alone is especially useful for the adsorption of hydrogen sulfide, tertiary butyl mercaptan, ethyl mercaptan, carbonyl sulfide and mixtures thereof.

An additional selective sulfur adsorbent that can be utilized with the zeolite adsorbent and the specialized sulfur adsorbent containing hydrated alumina adsorbent in the multi-component desulfurization system in place of, or in addition to, the above described selective sulfur adsorbents comprises zinc oxide alone or in combination with a carrier. While alumina is the preferred carrier, other carriers with similar performance characteristics can be utilized. In a preferred embodiment, the zinc oxide comprises at least about 60%, preferably from about 60 to about 95%, and more preferably from about 70 to about 90%, by weight, of the selective sulfur adsorbent with the remaining portion preferably comprising alumina. Additives may be added to this selective sulfur adsorbent to enhance its capacity to absorb sulfur compounds or other performance characteristics. The surface area of this selective sulfur adsorbent ranges from 5 to about 75 $m^2/g$ and preferably from about 10 to about 50 $m^2/g$. This zinc oxide/alumina selective sulfur adsorbent is prepared by conventional procedures.

The zinc oxide alumina selective sulfur adsorbent when used alone as a sulfur adsorbent has shown good sulfur adsorption when the sulfur compounds contained within the fuel cell fuel stream comprise hydrogen sulfide and ethyl mercaptan and mixtures thereof.

Another selective sulfur adsorbent that can be utilized with the zeolite adsorbent and the specialized sulfur adsorbent containing hydrated alumina adsorbent in the multi-component desulfurization system is comprised of activated carbon containing small quantities of copper oxide. In a preferred embodiment the activated carbon comprises from about 80 to about 95%, preferably 85 to 95%, by weight, of this selective sulfur adsorbent with the remaining portion comprising copper oxide. Additives may be added to the composition to enhance its performance. The activated carbon/copper oxide selective sulfur adsorbent is prepared by conventional procedures. The surface area of the composition ranges from about 300 to about 1000 $m^2/g$, with the preferred surface area being from about 500 $m^2/g$ to about 1000 $m^2/g$. This selective sulfur adsorbent is prepared by conventional procedures.

This activated carbon with copper oxide selective sulfur adsorbent when used alone has shown great utility for the adsorption of tetra hydro thiophene, tertiary butyl mercaptan, ethyl mercaptan and mixtures thereof.

An additional selective sulfur adsorbent that can be utilized with the zeolite adsorbent and the specialized sulfur adsorbent containing hydrated alumina adsorbent in the multi-component desulfurization system, comprises manganese compound(s), used alone, which may be utilized in a number of forms including $MnO_2$, $Mn_2O_3$, $Mn_3O_4$ and $Mn(OH)_4$ or mixtures thereof. The surface area of the manganese compound(s) range from about 100 to about 300 $m^2/g$, and preferably from about 200 to about 300 $m^2/g$. Additional materials may be combined with the manganese compound(s) including calcium, silver and magnesium to promote the performance of the manganese compound(s). Conventional methods are utilized for the formation of this selective sulfur adsorbent.

The manganese compound(s) selective sulfur adsorbent when used alone has shown great utility for the adsorption of hydrogen sulfide, tertiary butyl mercaptan, ethyl mercaptan and mixtures thereof.

An additional selective sulfur adsorbent, that can be utilized with the zeolite adsorbent and the specialized sulfur adsorbent containing hydrated alumina in the multi-component desulfurization system, comprises copper oxide with alumina, wherein the quantity of the copper oxide is from about 5 to about 25%, preferably from about 10 to about 20%, by weight, and the quantity of the alumina is from about 75 to about 95%, preferably from about 80 to about 90%, by weight. The surface area of this selective sulfur adsorbent is from about 100 to about 300 $m^2/g$ and preferably from about 150 to about 300 $m^2/g$. This selective sulfur adsorbent is prepared by conventional procedures.

This selective sulfur adsorbent when used alone has shown particularly usefulness for the adsorption of hydrogen sulfide, carbonyl sulfide, tertiary butyl mercaptan, ethyl mercaptan and mixtures thereof.

One preferred sequence of use of the adsorbents in the multi-component desulfurization system is the zeolite adsorbent placed prior to the specialized sulfur adsorbent containing hydrated alumina and followed by the selective sulfur adsorbent.

The preferred ratio of the zeolite adsorbent to the combination of the specialized sulfur adsorbent containing hydrated alumina and selective sulfur adsorbent is from about 1:3 to 3:1 and preferably 1:2 to about 2:1 and most preferably in the range from about 1:1, by volume.

The inventors have discovered that while a number of selective sulfur adsorbents may be utilized with the combination of the calcium exchange zeolite and the specialized sulfur adsorbent containing hydrated alumina to remove sulfur compounds from a feed stream, preferred selective sulfur adsorbents, especially when carbonyl sulfide is present, particularly for hydrogen generation, include: a) one or more manganese compounds blended with copper oxide on small quantities of a binder, b) one or more manganese compounds, iron oxide and a support, and c) copper oxide blended with zinc oxide, a carbon compound and a carrier, particularly alumina.

The inventors have surprisingly discovered that while several zeolites with different ion exchange may be useful as the zeolite adsorbent for this desulfurization system, are preferred ion exchanged zeolite is a calcium exchanged zeolite. Other ion exchange zeolites that may be utilized in the desulfurization system alone or in combination with calcium exchanged zeolite includes zeolites ion exchanged with cations selected from silver, lithium, copper, manganese, nickel, cadmium, iron, rhodium and ruthenium and mixtures thereof. Some particularly preferred ion exchange zeolites, other than calcium exchanged zeolite, include zeolites ion exchanged with nickel, silver, manganese and ruthenium and mixtures thereof. Notwithstanding, in an alternative preferred embodiment the cation on the zeolite may have had minimal or no ion exchange depending on the contents of the feed stream. In this embodiment the cations on the zeolite substantially comprise sodium and/or potassium ions.

While a number of zeolites are known, including zeolite A, zeolite X, zeolite Y, zeolite ZSM-5, zeolite Beta, synthetic mordenite and blends thereof, the preferred zeolite for this desulfurization system is a calcium exchanged zeolite X. A particularly preferred calcium exchanged zeolite X is a calcium exchanged, low silica zeolite X, known as "LSX", or calcium exchanged low silica faujasite, known as "LSF". Zeolite X generally has a Si:Al equivalent ratio of about 1.0 to about 1.25. In one example, a conventional, non-calcium exchanged precursor synthesized LSF has the following anhydrous chemical composition: 2.0 $SiO_2$:$Al_2O_3$:0.73 $Na_2O$:0.27$K_2O$, although the ratio between sodium and potassium cations can vary, sometime significantly, depending upon the process of manufacture of the LSF.

In one preferred embodiment, a substantial percentage of the cations of the zeolite X are ion exchanged with calcium ions using conventional ion exchange procedures, such as by treatment of the zeolite X with calcium salts, such as, but not limited to, calcium chloride. Several methods can be used for the ion exchange procedure with ion exchange preferably occurring after the zeolite adsorbent has been formed into its preferred final form, such as a bead or an extrudate. The zeolite X is ion exchanged to a level of at least about 50%, preferably at least 60%, more preferably at least 70%, and most preferably 85 to 95% of the exchangeable metal ions. The remaining ions may be sodium and/or potassium ions. (For reference purposes the term "calcium exchanged zeolite X" means a zeolite X containing at least about 50% calcium cations.)

The calcium exchanged zeolite X of one preferred embodiment of the invention generally contains some sodium or potassium ions in addition to the calcium ions after the calcium ion exchange. However, a portion, up to substantially all of these sodium/potassium ions, can be ion exchanged with other cations to enhance or modify the performance characteristics of the calcium exchanged zeolite X, especially for sulfur adsorption. For example, the additional cations that may be ion exchanged onto the zeolite X to enhance its performance include zinc, cadmium, cobalt, nickel, copper, iron, manganese, silver, gold, scandium, lithium, ruthenium, rhodium and combinations thereof. The percentage of ion exchange of these additional metal ions can range from as little as about 1% up to about 40% or so, depending upon the level of calcium ion exchange of the zeolite X. The particular metal ions that are ion exchanged onto the calcium exchanged zeolite depend on the particular sulfur compounds which are intended to be removed from the fuel cell fuel stream by the sequential sulfur adsorbent system of the invention.

The calcium exchanged zeolite, when utilized as a sulfur adsorbent, has shown significant capability for the adsorption of various sulfur materials, particularly tetra hydro thiophene (THT), di-methyl sulfide (DMS), tertiary butyl mercaptan (TBM) and ethyl mercaptan (EM).

The specialized sulfur adsorbent containing hydrated alumina preferably comprises a combination of a particular specialized sulfur adsorbent blended with hydrated alumina. The specialized sulfur adsorbent preferably comprises copper oxide, zinc oxide and an "aluminum component". The aluminum component utilized in this specialized sulfur adsorbent comprises x-ray diffraction amorphous aluminum that is intimately in contact with the copper and zinc components. The amorphous aluminum generally functions to dispense the copper and zinc components to achieve surprisingly high copper surface area. In one preferred embodiment of the specialized sulfur adsorbent, the quantity of the copper oxide present is preferably from about 50% to about 65%, more preferably from about 50% to about 60%, the quantity of the zinc oxide is from about 20 to about 35%, and the quantity of the amorphous aluminum is from about 5 to about 20% by weight, more preferably from about 10 to 20% of the specialized sulfur adsorbent.

The specialized sulfur adsorbent is prepared by conventional procedures. In a preferred embodiment the copper component, the zinc component and the amorphous aluminum component are prepared by a coprecipitation process. In one method for the preparation of this specialized sulfur adsorbent, the appropriate quantities of copper salts and zinc salts are mixed with the aluminum component in an aqueous solution to produce a precursor mixture. The copper salts and zinc salts utilized may be selected from a variety of known metal salts, such as the respective metal nitrates, sulfates, chlorides, acetates or combination thereof, with nitrates preferred. The aluminum component may be prepared by mixing with the other components an aluminum salt, such as aluminum nitrate, sulfate or a combination thereof. In an alternative embodiment the amorphous aluminum component is prepared separately from the copper and zinc components and is then combined with the copper and zinc components to produce the precursor material. Conventional procedures are then utilized to prepare the final component comprising copper oxide, zinc oxide and amorphous aluminum. In a preferred embodiment the composition is prepared according to the one of the processes disclosed in U.S. Pat. No. 6,693,057, the entirety of which is incorporated herein by reference. The materials are chosen so that the surface area of the specialized sulfur adsorbent is from about 100 to about 300 $m^2$/g, preferably from about 150 to 300 $m^2$/g. Further, the copper surface area is preferably at least about 12 $m^2$/g. In addition, in a preferred embodiment up to 70% of the aluminum is intercalated in the form of a hydrotalcite (($Cu,Zn)_6$ $Al_2(OH)_{16}$ $CO_3.4H_2O$) after precipitation but prior to washing and calcination.

Mixed with the copper oxide, zinc oxide, and amorphous aluminum specialized sulfur adsorbent is the hydrated alumina component. For purposes of this invention the terms "alumina hydrate" or "hydrated alumina" comprise aluminum hydroxides that commonly have the formula $Al(OH)_3$ or $AlO(OH)$. The crystalline forms of these hydrated aluminas are trihydroxides and include gibbsite, bayerite and nordstrandite. Hydrated alumina also includes aluminum oxidehydroxides such as crystalline boehmite, pseudo-boehmite, and diaspore. The preferred forms of hydrated alumina for the this component of the invention include crystalline boehmite, pseudo-boehmite and gibbsite. This hydrated alumina is chemically distinct from the amorphous aluminum that is an important component of the specialized sulfur adsorbent described above.

While non-activated hydrated alumina is a preferred form of hydrated alumina for the desulfurization system, "activated" hydrated aluminas may also have utility for some sulfur removal applications. For purposes of this invention, "activation" of hydrated alumina requires impregnation of the hydrated alumina component with one or more alkali metal or alkaline earth metal ions, preferably in an amount from about 0.01 to about 10 wt. %, wherein the wt. % is measured as a percentage weight of the impregnated alkali metal or alkaline earth metal to the total weight of the alkali metal/alkaline earth metal and aluminum in the composition. Activated hydrated alumina is generally activated by impregnation with alkali metal ions, most preferably sodium or potassium ions. Activated hydrated alumina of this type is prepared by methods recognized in the art, such as those disclosed, for example, in U.S. Pat. Nos. 3,058,800 and 4,835,338, both of which patents are incorporated herein by reference.

Following the preparation of the specialized sulfur adsorbent and the hydrated alumina, the two materials are blended together. The hydrated alumina component of the material comprises from about 90 to about 50% of the specialized sulfur adsorbent containing hydrated alumina with the copper oxide, zinc oxide, amorphous aluminum specialized sulfur adsorbent component comprising from about 50% to about 10% by weight.

For preparation of the final component, a small amount of a conventional binder material, such as Volclay, a silica composition provided by Volclay Pty. Ltd., is blended with the specialized sulfur adsorbent and the hydrated alumina component. A small amount of water is then added to the mixture to permit blending of the materials. After the materials are conventionally blended, the blend is extruded, dried and then calcined at a relatively low temperature, which is less than 500° C., preferably less than 400° C., and most preferably about 320° C. or less. The use of low temperature calcination preserves the "hydrated" nature of the hydrated alumina component of the specialized sulfur adsorbent containing hydrated alumina component. An important aspect of the composition of this sulfur adsorbent is the presence of both amorphous aluminum and hydrated alumina, which commonly has the formula $Al(OH)_3$ or $AlO(OH)$. The specialized sulfur adsorbent containing hydrated alumina has shown surprising utility for the adsorption of sulfur components, such as COS.

In one preferred embodiment this specialized sulfur adsorbent containing hydrated alumina component may be utilized individually as a sulfur adsorbent in a desulfurization system within a feed stream, particularly for the adsorption of carbonyl sulfide. However, in a more preferred embodiment, the specialized sulfur adsorbent containing hydrated alumina component is combined with other sulfur adsorbent materials to form a desulfurization system.

It has been surprisingly discovered that the capability of the selective sulfur adsorbents described above, the specialized sulfur adsorbent containing hydrated alumina described above, and the calcium exchanged zeolite described above, when used individually, can be enhanced by the utilization of the calcium exchanged zeolite and the specialized sulfur adsorbent containing hydrated alumina when utilized in combination with one of the selective sulfur adsorbents in the flow of the feed stream to form a multi-component desulfurization system for the desulfurization of a hydrocarbon fuel cell feed stream. The use of this combination of materials, permits the adsorption of a broader range of sulfur containing compounds than has conventionally been adsorbed using any of the components individually. For example, it has been surprisingly discovered that by the use of calcium exchanged zeolite X, specialized sulfur adsorbent containing hydrated alumina, and selective sulfur adsorbents, enhanced sulfur adsorption of a broad range of sulfur compounds, including particularly carbonyl sulfide as well as hydrogen sulfide, tetra hydro thiophene, dimethyl sulfide, and various mercaptans, including ethyl, methyl, propyl, and tertiary butyl mercaptan and combinations thereof, is possible. This combination of components has shown particular utility for the removal of carbonyl sulfide from a feed stream, even when the level of conventional hydrolysis agents, such as water, ethanol, and methanol, in the feed stream is low, i.e. less than about 500 ppm. Efficient removal occurs even without the addition of conventional hydrolysis agents. In addition, especially efficient removal of carbonyl sulfide to levels as low as 50 ppb has been achieved using this multi-component desulfurization system.

It has also been surprisingly discovered that the breakthrough time for sulfur compounds commonly present in a hydrocarbon fuel system can be extended by the use of the calcium exchanged zeolite X, specialized sulfur adsorbent containing hydrated alumina and selective sulfur adsorbent when utilized as a multi-component desulfurization system in the feed stream. This breakthrough time is enhanced over a desulfurization system containing only the calcium exchanged zeolite and the selective sulfur adsorbent when used in combination. This extension of breakthrough time is particularly apparent when the selective sulfur adsorbent is selected from an adsorbent comprising: a) one or more manganese compounds, iron oxide and a high surface area carrier, particularly alumina; b) copper oxide, zinc oxide, a carrier, particularly an amorphous aluminum, and preferably small quantities of a carbon compound; and c) one or more manganese compounds, copper oxide and a binder.

It has also been surprisingly discovered that by placement of the calcium exchanged zeolite X prior to the specialized sulfur adsorbent containing hydrated alumina, which is then followed by a selective sulfur adsorbent in the multi-component desulfurization system, the likelihood of the production of synthesized sulfur compounds is substantially reduced.

The inventors have also surprisingly discovered that the multi-component desulfurization system, as described herein, can be utilized at temperatures lower than normally utilized for conventional sulfur adsorption systems. While conventional chemical sulfur adsorbents require temperatures for the feed stream of at least about 150° C. to about 400° C., embodiments of the sequential sulfur adsorbent system can be utilized effectively to adsorb the sulfur contaminants at temperatures below 100° C. Such embodiments can be especially effective for removal of some sulfur compounds at temperatures from ambient temperature to 100° C., particularly from ambient to 60° C.

In addition, when the multi-component desulfurization system as described is used, the pressure on the feed stream can be reduced to a range from about 1 bar to about 18 bar, preferably from about 1.7 bar to about 7 bar. These pressure ranges are lower than normally are utilized for the adsorption of sulfur compounds in a conventional fuel cell processing train.

In addition, when the multi-component desulfurization system, as described herein, is used, the applicants have surprisingly discovered that it is not necessary that there be a conventional hydrolysis agent, such as water, ethanol, or methanol in the feed stream to enhance sulfur removal. In previous sulfur adsorbent systems, especially those used for the removal of carbonyl sulfide, it was necessary that a hydrolyzing agent, either be present in the feed stream or be added to the feed stream in significant quantities. The inventors have surprisingly discovered that efficient and effective sulfur removal, especially for the removal of carbonyl sulfide, can occur when the multi-component desulfurization system of the invention is utilized, even when the quantity of water or other hydrolyzing agents in the feed stream is less than 500 ppm. In fact, the absence of water or other hydrolyzing agents from the feed stream in amounts greater than 500 ppm is a preferred composition for a feed stream utilizing the multi-component desulfurization system of the invention to reduce the likelihood that the calcium exchanged zeolite absorbs excessive levels of water or other hydrolyzing agents.

The inventors have also surprisingly discovered a method for supplying a substantially desulfurized hydrocarbon fuel stream to a fuel cell processor using the multi-component desulfurization system described herein. In this process a sulfur contaminated hydrocarbon fuel stream is passed over or through the multi-component desulfurization system of a fuel cell processor at a temperature from about ambient to about 100° C., preferably less than 60° C., and more preferably at ambient temperatures. By passing a hydrocarbon fuel stream comprising, for example, natural gas, propane or LPG, containing sulfur components at levels up to 500 ppm, a substantial reduction in the quantity of those sulfur compounds, preferably down to a level of less than about 50 ppb, can be achieved. It has also been surprisingly discovered that this reduction in sulfur occurs even when the level of water or other hydrolyzing agents in the fuel stream is less than 500 ppm. Utilization of feed streams with this low level of water or other hydrolyzing agents is a preferred embodiment.

The inventors have also discovered that the above-described multi-component desulfurization system of the invention can be used in a desulfurizer, particularly for use in a fuel cell processing train. This desulfurizer includes an inlet for receiving the nondesulfurized hydrocarbon fuel stream, such as natural gas, propane or LPG, the sequential sulfur adsorbent system, as described herein, which is placed in a location to desulfurize the hydrocarbon fuel stream, and an outlet where the desulfurized hydrocarbon fuel stream is passed down stream for further processing. For example, the desulfurized hydrocarbon fuel stream can be passed through the fuel cell processing train to the fuel cell stack for the production of electricity.

The inventors have also surprisingly discovered that this method for supplying a substantially desulfurized hydrocarbon fuel stream is more advantageous than methods using conventional desulfurization systems as it permits desulfurization of a broader range of sulfur compounds, increases the sulfur compound breakthrough time for the system, reduces the production of synthesized sulfur compounds, reduces the required temperature of and pressure on the feed stream, does not require the presence of substantial quantities of water or other hydrolyzing agents in the feed stream, and permits the choice of different selective sulfur adsorbents to be used in the sequential sulfur adsorbent system depending on the sulfur compounds that are present in the particular feed stream. The compositions and methods of the processes also permit the production of a substantially desulfurized hydrocarbon fuel stream containing levels of sulfur below those achievable with conventional desulfurizing processes.

The inventors have also discovered that the multi-component desulfurization system as described herein can be used in fuel cell processors for a longer period of time than conventional adsorbents and still achieve high levels of sulfur absorbency.

The inventors have also discovered that the multi-component desulfurization system as described herein is also not subject to desorption of the adsorbed sulfur compounds when the conditions surrounding the sulfur adsorbent system change, as often occurs with some conventional sulfur adsorbents.

EXAMPLES

The following example is intended to be illustrative to teach one of ordinary skill in the art to use this composition. This example is not intended to limit the invention in any way.

In order to illustrate one embodiment of the composition of the invention, the inventors have compared the performance of three sulfur adsorbents: 1) an adsorbent comprising hydrated alumina impregnated with copper oxide, wherein the copper oxide comprises 18% of the composition and the hydrated alumina comprises 82% (Adsorbent #1); 2) an adsorbent comprising copper oxide, zinc oxide and amorphousaluminum, (Adsorbent #2) wherein the copper oxide comprises 59%, the zinc oxide comprises 28% and the alumina comprises 14% of the adsorbent; and 3) the inventive adsorbent comprising 70% crystalline hydrated alumina and 30% of adsorbent 2. (Adsorbent #3) The hydrated alumina of Adsorbent #1 and Adsorbent #3 is comprised of crystalline boehmite.

The volume of the adsorbents used in the tests is 10 ccs. Adsorbent #1 is in the form of 3.2 mm extrudates. Adsorbent #2 is produced in the form of ³⁄₁₆ in.×³⁄₃₂" (4.75 mm×2.38 mm) tablets. Adsorbent #3 is in the form of 2.5 mm spheres. Each adsorbent is sized using a 16×20 mesh sieve to lessen the impact of the different shapes and sizes of the adsorbents.

A synthetic natural gas feed stream is utilized comprising 93% methane, 3% ethane, 2% propane, 0.2% butane, 1% carbon dioxide and 0.75% nitrogen. Also included in this synthetic natural gas is 9 ppm (as sulfur) of carbonyl sulfide, 14 ppm of THT, 5 ppm of $H_2S$ and 10 ppm of EM. This synthetic natural gas is passed through an artificial reactor containing the three sulfur adsorbents in three separate test runs.

The components are sized and loaded into the reactor and the synthetic natural gas feed stream is passed through the reactor. The temperature of the feed stream is maintained at 38° C. with a space velocity of 3000 $hr^{-1}$ at a pressure of 2 bar. "Breakthrough" for this test occurs when an amount greater than 1 ppm of sulfur in the form of carbonyl sulfide is observed in the natural gas feed stream after passage through the adsorbent systems.

To determine the gas phase sulfur level of the feed stream, analysis is performed using an Agilent 6890 gas chromatograph attached to an Antek 7090 sulfur analyzer. The gas chromatograph utilizes a 60 m×320 micron DB-1 capillary column for sulfur compound separation. The Antek 7090 utilizes a sulfur chemiluminescense detector (SCD) for sulfur detection. The operational detection limit for the system is approximately 50 ppb (mole). The test unit is controlled by automation software.

Figure 1:
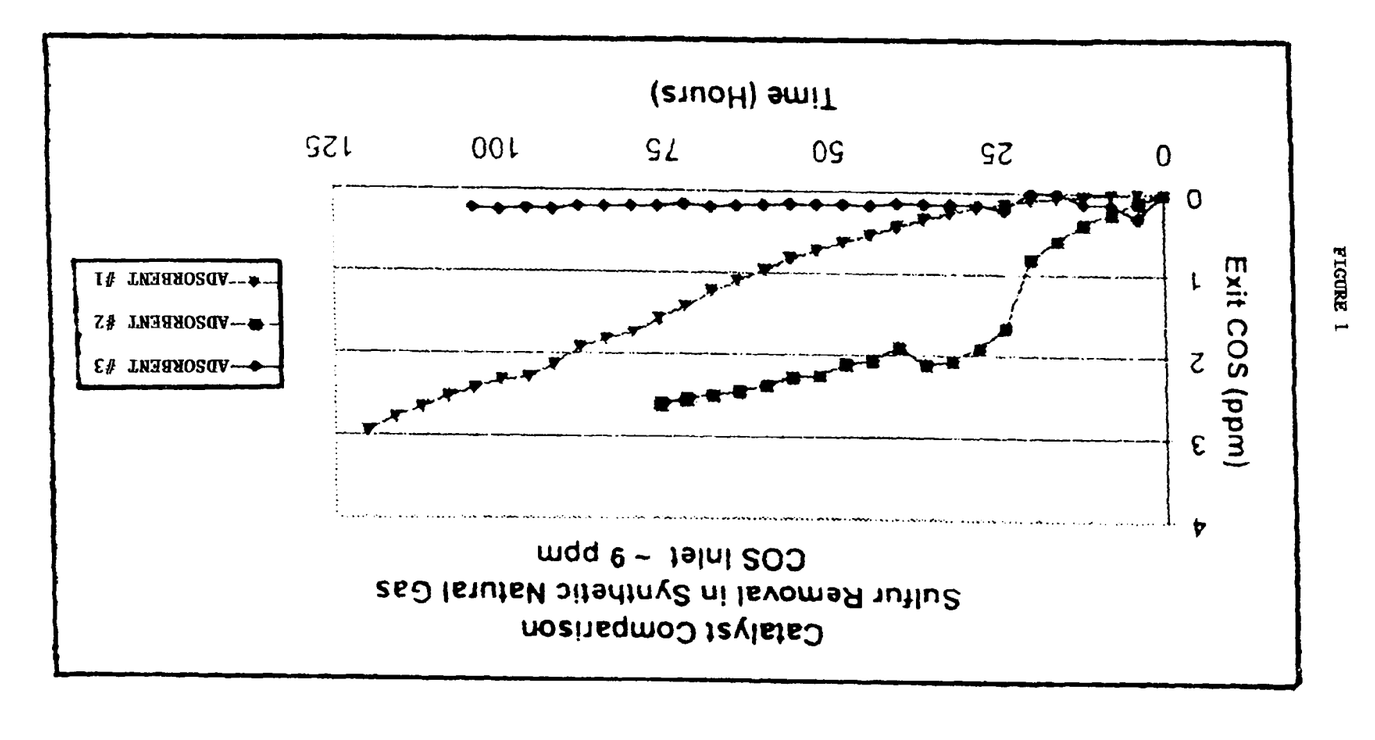
FIG. 1 is a graph showing a comparison of the performance of three adsorbents for the removal of carbonyl sulfide from a synthetic natural gas feed stream.

The absorbency of the three adsorbents is shown in attached FIG. 1. The percent "S" in the form of COS that was removed by the system is shown in FIG. 1. FIG. 1 also shows that for the breakthrough for the adsorbent comprising copper oxide, amorphous aluminum, and zinc oxide (Adsorbent #2) occurred at about 25 hours. When the adsorbent used is copper deposited upon a hydrated alumina (Adsorbent #1);

breakthrough occurred at about 60 hours. Finally, when Adsorbent #3 was used, breakthrough does not occur until after 100 hours.

As is clear from these examples, the adsorbent comprising CuO, ZnO, amorphous aluminum and hydrated alumina extended the lifetime of the sulfur adsorbent system.

As many changes and variations in the disclosed embodiments may be made without departing from the inventive concept, the invention is not intended to be limited by this description.

The invention claimed is:

1. A process for desulfurization of a hydrocarbon feed stream comprising
    providing a hydrocarbon feed stream, which is contaminated with sulfur compounds, including carbonyl sulfide,
    passing the sulfur contaminated feed stream through a desulfurization system comprising a specialized sulfur adsorbent containing amorphous aluminum blended with hydrated alumina to produce a hydrocarbon feed stream which has been substantially desulfurized.

2. The process of claim 1, wherein the specialized sulfur adsorbent comprises copper oxide, zinc oxide and amorphous aluminum.

3. The process of claim 1 wherein the desulfurization system further comprises a zeolite sulfur adsorbent and a selective sulfur adsorbent.

4. The process of claim 1, wherein the composition of the hydrated alumina is selected from crystalline boehmite, pseudo-boehmite and gibbsite.

5. The process of claim 1, wherein the composition of the hydrated alumina is selected from $Al(OH)_3$ and $AlO(OH)$.

6. The process of claim 1, wherein the temperature of the sequential sulfur adsorbent system, as the feed stream passes therethough, is from ambient to about 100° C.

7. The process of claim 1, wherein the temperature of the sequential sulfur adsorbent system, as the feed stream passes therethough, is from ambient to about 60° C.

8. The process of claim 1, wherein the specialized sulfur adsorbent containing alumina blended with hydrated alumina comprises from about 10% to about 50% of the specialized sulfur adsorbent blended with from about 90% to about 50% of the hydrated alumina.

9. A process for desulfurization of a hydrocarbon fuel cell feed stream comprising
    providing a hydrocarbon feed stream to a fuel cell processing train, wherein the feed stream is contaminated with sulfur compounds, including carbonyl sulfide,
    passing the sulfur contaminated feed stream through a desulfurization system comprising, a specialized sulfur adsorbent containing amorphous aluminum blended with hydrated alumina to produce a hydrocarbon feed stream which has been substantially desulfurized, and
    delivering the substantially desulfurized hydrocarbon feed stream to remaining components of the fuel cell processing train.

10. The process of claim 9, wherein the temperature of the sequential sulfur adsorbent system as the feed stream passes therethough is from ambient to about 100° C.

11. The process of claim 8, wherein the specialized sulfur adsorbent comprises copper oxide, zinc oxide, and amorphous aluminum which have been coprecipitated.

12. The process of claim 8, wherein the desulfurization system further comprises a zeolite sulfur adsorbent and a selective sulfur adsorbent.

13. The process of claim 8, wherein the temperature of the sequential sulfur adsorbent system, as the feed stream passes therethough, is from ambient to about 60° C.

14. A process for the desulfurization of a hydrocarbon fuel cell feed stream in a fuel cell comprising
    providing the hydrocarbon feed stream to a fuel cell processing train, wherein the feed stream is contaminated with sulfur compounds, including one or more compounds selected from the group consisting of carbonyl sulfide, hydrogen sulfide, tetra hydro thiophene, dimethyl sulfide, mercaptans, disulfides, thiophenes, sulfoxides, other organic sulfides, and higher molecular weight organic sulfur compounds and combinations thereof,
    passing the sulfur contaminated feed stream through a desulfurization system comprising, a specialized sulfur adsorbent containing amorphous aluminum blended with hydrated alumina, wherein the hydrated alumina is selected from the group consisting of crystalline boehmite, pseudo-boehmite, gibbsite and mixtures thereof,
    delivering the substantially desulfurized hydrocarbon feed stream to remaining components of the fuel cell processing train.

15. The process of claim 14, wherein the specialized sulfur adsorbent comprises copper oxide, zinc oxide and amorphous aluminum which have been coprecipitated.

16. The process of claim 14, wherein the desulfurization system further comprises a zeolite sulfur adsorbent and a selective sulfur adsorbent.

17. The process of claim 14, wherein the specialized sulfur adsorbent containing alumina blended with hydrated alumina comprises from about 10% to about 50% of the specialized sulfur adsorbent blended with from about 90% to about 50% of the hydrated alumina.

18. The process of claim 14, wherein the temperature of the sequential sulfur adsorbent system as the feed stream passes therethrough is from ambient to about 100° C.

19. The process of claim 14, wherein the pressure of the sulfur contaminated feed stream as it passes through the sequential sulfur adsorbent system is from about 1 bar to about 18 bar.

* * * * *